Jan. 1, 1924. 1,479,770
G. BROULHIET
SHOCK ABSORBER FOR VEHICLES
Filed April 16, 1923
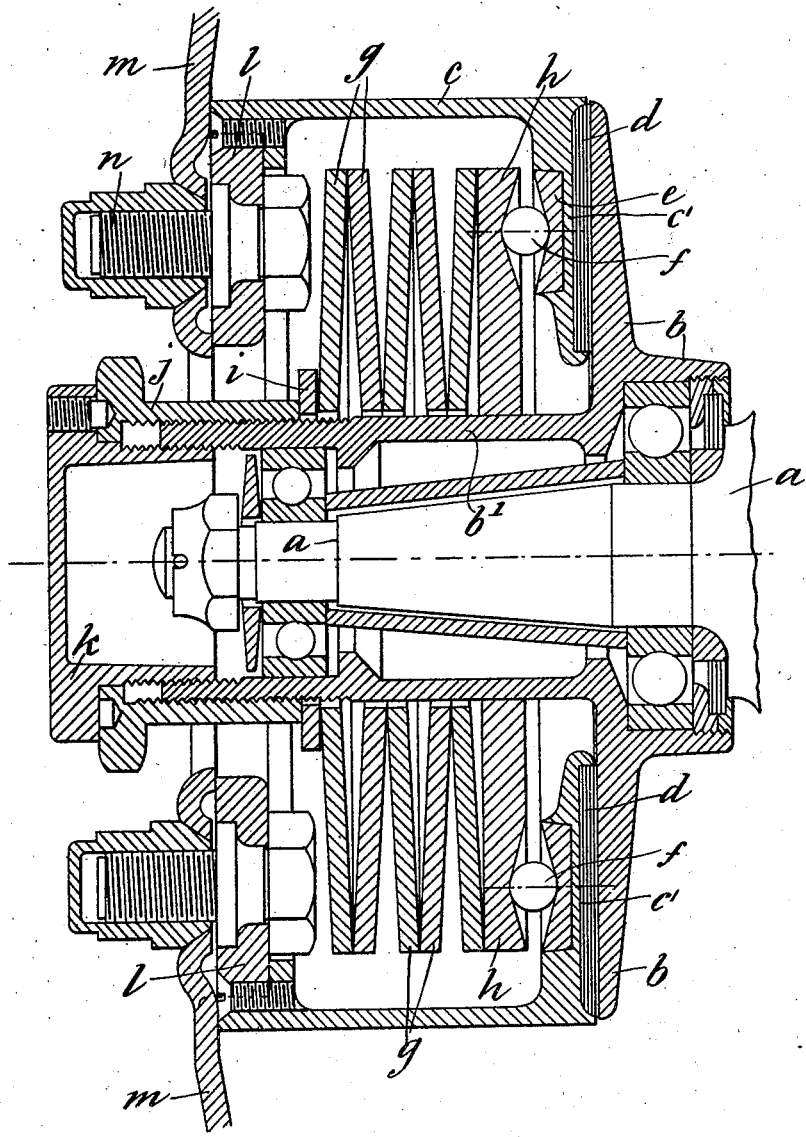
Inventor
Georges Broulhiet
By
Attorney Patented Jan. 1, 1924.

1,479,770

UNITED STATES PATENT OFFICE.

GEORGES BROULHIET, OF ST. ETIENNE, FRANCE.

SHOCK ABSORBER FOR VEHICLES.

Application filed April 16, 1923. Serial No. 632,451.

*To all whom it may concern:*

Be it known that I, GEORGES BROULHIET, a citizen of the French Republic, residing in St. Etienne, France, have invented a certain new and useful Shock Absorber for Vehicles, of which the following is a specification.

The shock absorber which is the object of the present invention is intended to prevent the wheels of vehicles of any kind from rebounding from the ground. A frictional device is mounted in the hub of the wheel in such a manner that it allows the wheel to slide in the radial direction. The displaced rim is thus brought into an eccentric position relatively to the hub and the device then acts to absorb the energy of motion during the return movement.

The accompanying drawing shows by way of example a construction according to the invention.

On the axle $a$ of the vehicle is mounted by any suitable means a hub comprising a disc $b$ and a tubular member $b'$. A drum $c$ is arranged to slide relatively to the internal face of the disc $b$ against which it is pressed by a ring $d$ fixed on the outer face of an end plate $c'$ integral with the drum. The ring $d$ is made of a substance adapted to withstand the friction which is set up between the disc $b$ and the end plate $c'$ of the drum $c$ when the system is in operation. In the interior of the drum are disposed a number of seatings $e$, the external face of each of which is recessed conically to house a ball $f$. On the tubular part $b'$ of the hub is mounted a suitable number of washers $g$ of the Belleville type, for example, acting as a spring. This spring abuts on the one hand against a disc $h$ mounted with slight friction on the cylindrical part of the hub. Conical recesses are provided on the disc $h$ corresponding to those on the seatings $e$ and also forming seatings for the balls $f$. The spring system $g$ is maintained in place, on the other hand, on the tubular part $b'$ by a washer $i$ of which the position is determined by a nut $j$ to which is applied a lock nut $k$ forming a cap for the part $b'$ of the hub.

A disc $l$ closes the end of the drum and supports by a number of bolts $n$ the wheel indicated at $m$. The wheel which can be of any type is thus rendered rigid with the drum and consequently independent of the hub.

The apparatus when suitably adjusted acts in the following manner:

The restoring force and the frictional resistance are both proportional to the force of the spring.

The values of the restoring force and of the frictional resistance are proportional, respectively, to the inclination of the seating of the balls and the coefficient of friction of the rubbing surface.

At its rear side the spring is adjusted so that the frictional resistance is less than the weight of the vehicle acting on the axle, but such that the friction together with the restoring force due to the displacement of the balls is greater than this weight.

Under the action of a shock the drum slides, overcoming the frictional resistance which damps the effect due to the obstacle.

If the wheel did not rotate, it could not be brought back to the central position since the restoring force due to the displacement of the balls must overcome not only the frictional resistance but also the weight of the vehicle which is now below the centre of the hub.

When the wheel has made more than half a revolution the weight of the vehicle is acting at a point above instead of below the centre of the hub, and, as this weight together with the restoring force due to the displacement of the balls is greater than the frictional resistance, the wheel immediately returns to its central position.

The importance of the invention lies in two facts: The first consists in the advantages gained by the simplicity of the construction; the second is that the restoring force and the frictional resistance are always directly proportional whatever pressure is exerted by the spring, a necessary condition for the proper functioning of the apparatus.

Having thus described the nature of the said invention and the best means I know of carrying the same into practical effect, I claim:—

1. A shock absorber for vehicles, comprising in combination an axle and hub, a wheel, a drum secured to said wheel coaxial with and displaceable in a radial direction relatively to said hub, an end plate integral with said hub and at right angles to the axis thereof, an end plate integral with said drum and in frictional engagement with said end plate on the hub, conical seatings on said end plate integral with the drum, a disc slidable on said hub enclosed in said drum, conical seatings on said disc, balls enclosed between said sets of seatings and resilient means for pressing said disc against said balls.

2. A shock absorber for vehicles, comprising in combination an axle and hub, a wheel, a drum secured to said wheel coaxial with and displaceable in a radial direction relatively to said hub, an end plate integral with said hub and at right angles to the axis thereof, an end plate integral with said drum and in frictional engagement with said end plate on the hub, conical seatings on said end plate integral with the drum, a disc slidable on said hub enclosed in said drum, conical seatings on said disc, balls enclosed between said sets of seatings, springs surrounding said hub and a nut screw-threaded on the end of said hub at the end opposite to said end plate and a washer on said hub between said nut and said springs.

3. A shock absorber for vehicles, comprising in combination an axle and hub, a wheel, a drum secured to said wheel coaxial with and displaceable in a radial direction relatively to said hub, an end plate integral with said hub and at right angles to the axis thereof, an end plate integral with said drum and in frictional engagement with said end plate on the hub, conical seatings on said end plate integral with the drum, a disc slidable on said hub enclosed in said drum, conical seatings on said disc, balls enclosed between said sets of seatings and resilient means for pressing said disc against said balls, said drum and its contents being readily removable from said hub.

4. A shock absorber for vehicles, comprising in combination an axle and hub, a wheel, a drum secured to said wheel coaxial with and displaceable in a radial direction relatively to said hub, a radial extension of the drum and a radial extension of the hub in frictional engagement with said drum extension, balls and conical seatings therefor in said drum extension, a disk loosely mounted on said hub, conical seatings for said balls therein, a washer axially adjustable on said hub, a spring consisting of Belleville washers, inserted between said disk and said washer and adapted to press said balls against their seatings and said drum extension against said hub extension.

In testimony whereof I have signed my name to this specification.

GEORGES BROULHIET. [L. s.]